(12) United States Patent
Scharr et al.

(10) Patent No.: US 12,234,097 B2
(45) Date of Patent: Feb. 25, 2025

(54) REINFORCED FOOD GRADE BELTS AND MANUFACTURING METHOD

(71) Applicant: GATES CORPORATION, Denver, CO (US)

(72) Inventors: Mark William Scharr, Deerfield, NH (US); Gerhard Hans Fickenwirth, Beverly, MA (US)

(73) Assignee: Gates Corporation, Denver, CO (US)

( * ) Notice: Subject to any disclaimer, the term of this patent is extended or adjusted under 35 U.S.C. 154(b) by 66 days.

(21) Appl. No.: 17/910,397

(22) PCT Filed: Mar. 18, 2021

(86) PCT No.: PCT/US2021/022893
§ 371 (c)(1),
(2) Date: Sep. 9, 2022

(87) PCT Pub. No.: WO2021/188760
PCT Pub. Date: Sep. 23, 2021

(65) Prior Publication Data
US 2023/0122335 A1 Apr. 20, 2023

Related U.S. Application Data

(60) Provisional application No. 62/992,273, filed on Mar. 20, 2020.

(51) Int. Cl.
*B65G 15/34* (2006.01)
*B65G 15/42* (2006.01)
*F16G 1/08* (2006.01)
*F16G 1/28* (2006.01)
*F16G 3/10* (2006.01)

(52) U.S. Cl.
CPC ............ *B65G 15/34* (2013.01); *B65G 15/42* (2013.01); *F16G 1/08* (2013.01); *F16G 1/28* (2013.01); *F16G 3/10* (2013.01); *B65G 2207/26* (2013.01)

(58) Field of Classification Search
CPC .... B65G 15/34; B65G 15/42; B65G 2207/26; B65G 15/36; F16G 1/08; F16G 1/28; F16G 3/10; F16G 1/10
See application file for complete search history.

(56) References Cited

U.S. PATENT DOCUMENTS

| | | | |
|---|---|---|---|
| 3,880,558 A * | 4/1975 | Breher | B29C 43/222 164/419 |
| 5,083,985 A | 1/1992 | Alles | |
| 5,558,207 A * | 9/1996 | Zabron | B65G 15/34 198/847 |

(Continued)

OTHER PUBLICATIONS

Commissioner for Patents, International Search Report application No. PCT/US2021/022893, mailing date Jul. 26, 2021.

*Primary Examiner* — Mark A Deuble
(74) *Attorney, Agent, or Firm* — Kevin J. Aiken, Esq

(57) ABSTRACT

A continuous loop reinforced food grade belt includes a plurality of extruded filaments comprising a meltable synthetic polymer, and at least one matrix material embedding the filaments. The matrix material includes a food grade polymer, and the matrix material and filaments form a length of belt having opposed first and second ends. The first and second ends are melted together to form a continuous loop belt with no filaments exposed to the belt environment.

17 Claims, 10 Drawing Sheets

(56) References Cited

U.S. PATENT DOCUMENTS

| | | | |
|---|---|---|---|
| 6,966,763 B2* | 11/2005 | Goser | B29C 48/08 |
| | | | 425/114 |
| 7,074,729 B2* | 7/2006 | Leighton | B65G 15/34 |
| | | | 442/164 |
| 9,829,068 B2* | 11/2017 | Marchetti | B29C 66/14 |
| 2003/0070967 A1 | 4/2003 | Whitlock et al. | |
| 2008/0047656 A1 | 2/2008 | Fickenwirth et al. | |
| 2010/0044382 A1* | 2/2010 | Woerner | D06M 15/256 |
| | | | 99/422 |
| 2010/0151757 A1 | 6/2010 | Herbert et al. | |
| 2011/0303101 A1 | 12/2011 | Fan et al. | |
| 2013/0153123 A1 | 6/2013 | Pasch et al. | |

* cited by examiner

REINFORCED FOOD GRADE BELTS AND MANUFACTURING METHOD

BACKGROUND OF THE INVENTION

1. Field of the Invention

This invention relates generally to reinforced belts, and more particularly relates to reinforced food grade belts and related manufacturing methods.

2. Description of the Prior Art

Conventional processes of continuous extrusion-forming of thermoplastic elastomer ("TPE") or thermoplastic urethane ("TPU") reinforced belting utilize aramid reinforcing members for dimensional stability (e.g., fibers, filaments and cords) that are susceptible to hosting bacteria when exposed. Such reinforcing members are often exposed as a result of secondary fabrication processes such as forming the belting into an endless belt or continuous loop (i.e., cord often pops out at or near the interface of the mating ends of the belt).

In other processes, non-reinforced food grade belts are used to avoid exposing materials that would not be deemed acceptable in the food industry. These types of non-reinforced food grade belts typically consisting of urethane only and lack reinforce. As such, these belts have a tendency to stretch while in use, resulting in manufacturing shutdowns so the conveyor lines can be stopped and the belt to be reworked to take up the excessive slack.

Thus is a need for an improved food grade belt, that has both reinforcement and reduced susceptibility to bacteria growth so as to complies with safety protocols to be food grade compliant.

SUMMARY OF THE INVENTION

The present disclosure is directed to reinforced food grade belting, endless belts, and related methods of manufacturing the same. By replacing the aramid fiber cords currently within existing food grade belts with a filament (e.g., monofilament or multi-filament cord) comprised of alternative materials, particularly meltable, thermoplastic materials, one can still reinforce the belt while also significantly reducing the chance of exposing any material that is susceptible to bacteria growth on the belt that would prohibit the belt from being considered food grade compliant. The filament may be made from synthetic polymers that have a melting temperature equivalent or less than the primary material used to produce the belt. This would permit the new filament to effectively melt into the belt when the belt ends are connected together using a heat source to form a continuous loop belt, thus removing any chance of exposing any portion of the belt that would prohibit the belt from being considered food grade compliant.

One aspect of the present disclosure relates to a method of manufacturing a reinforced food grade belt. The method includes providing a plurality of thermoplastic synthetic filaments, providing a thermoplastic elastomeric belt body material, embedding the filaments in the belt body material, and forming the body material into a desired belt profile.

The method may be continuous, resulting in long-length belting. The method may include cutting the belting to a predetermined length and fusing the ends together to form an endless belt. The plurality of filaments may be melted during the fusing step. The plurality of filaments may be arranged in parallel and extend along a length dimension of the belt. The plurality of filaments may include a meltable synthetic polymer. The plurality of filaments may have a melting point that is equal to or less than a melting point of the belt body material. Each of the plurality of filaments may include a monofilament or a multi-filament cord. The filaments may be directed into the first layer material with a die during extrusion of the first layer material. The desired belt profile may be a planar surface.

Another aspect of the present disclosure relates to a continuous loop reinforced food grade belt. The belt includes a plurality of extruded filaments comprising a meltable synthetic polymer, and at least one matrix material embedding the filaments. The matrix material includes a food grade polymer, and the matrix material and filaments form a length of belt having opposed first and second ends. The first and second ends are melted together to form a continuous loop belt with no filaments exposed to the belt environment.

The belt may include a second layer material extruded onto the first layer material, and the filaments may be embedded between the first and second layer materials. The first layer material and the second layer material may include thermoplastic elastomer or thermoplastic polyurethane. The first layer material may define a smooth surface of the belt and the second layer material may define a surface having a plurality of ridges or teeth. The filaments may be continuous along a loop shape of the belt. Each of the filaments may include a monofilament or a multi-filament cord. The filaments may be resistant to bacteria.

A further aspect of the present disclosure relates to a method of manufacturing a continuous loop reinforced food grade belt. The method includes providing a plurality of meltable synthetic filaments arranged in parallel, extruding a layer material to form the belt with the filaments embedded therein, the belt having opposed free ends with the filaments exposed at the free ends, positioning the free ends adjacent to each other, and melting the filaments and layer material at the free ends to connect the free ends together to form the continuous loop reinforced food grade belt. The filaments and layer material may include food grade polymer materials. Extruding the layer material may include extruding a first layer material onto the filaments, and extruding a second layer material onto the layer material.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
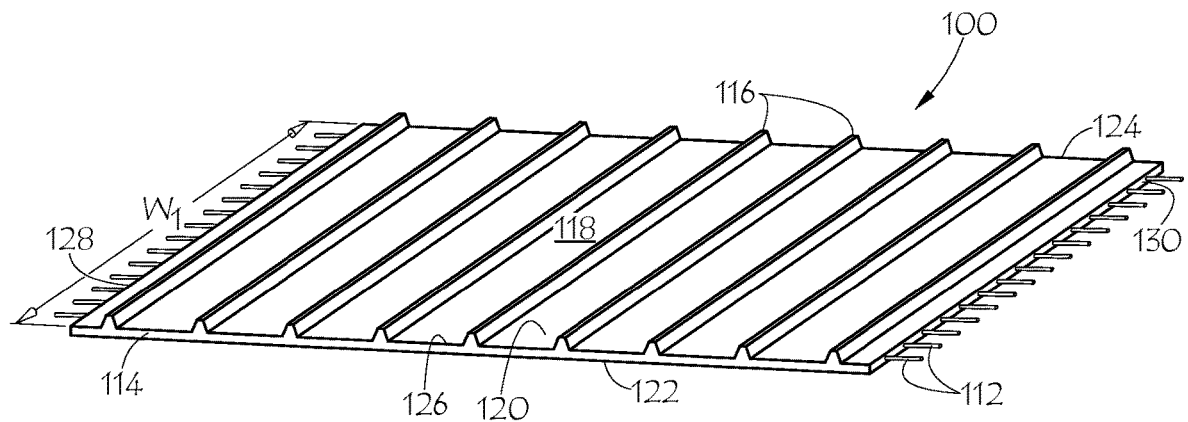
FIG. 1 is a perspective view of an example reinforced belt in accordance with the present disclosure.

The present disclosure provides methods and apparatuses for manufacture of open ended belts made of an elastomeric matrix in which reinforcing members (e.g., filaments) are embedded in a longitudinal direction. The present disclosure also relates to such reinforced belts, whether provided as endless belts or continuous loop belts. Such belts can be toothed belts, flat belts, multi-v-ribbed belts, conveyor belts and similar products. Particularly useful are toothed belts which may require precise control of the tooth spacing or "pitch." The elastomeric matrix can be a thermoplastic polyurethane (TPU) or any other suitable thermoplastic elastomer (TPE). The process may also be adapted for castable or thermoset resins or for a vulcanized rubber matrix. The matrix may be a combination of materials, such as a laminate or blend. The matrix material(s) may include any number of desirable ingredients, including for example, anti-oxidants, anti-ozonants, UV stabilizers, anti-microbial additives, process aids, softeners, fillers, friction modifiers, foamers, and the like.

The filaments (also referred to as fibers, multi-filament cords, and tension members) typically consist of a polymer material, such as a synthetic thermoplastic polymer material. The filaments may include a bundle of fibers, filaments or the like and may be twisted or cabled. A cord may be a monofilament or a bundle of filaments (.i.e. a yarn) or a twisted, braided, or cabled yarn or bundle of yarns and may be treated for adhesion or handling purposes. The term cable is often used interchangeably with the term cord. Herein, filaments will be used to refer to all types of multi-filament members, tension members, cords, or tensile cords.

The filaments disclosed herein (e.g., monofilament and multi-filament cords) may be made from a thermoplastic, synthetic polymer and may be extruded or spun as a single strand or multiple strands. The filament is preferably resistant to hosting bacteria and preferably hydrophobic depending on the material properties. When belt ends are terminated, exposed portions of such filaments would not be perceived as problematic in the food grade industry. More importantly, when the exposed belt ends are heated prior to fusing them together to make an endless belt, the thermoplastic filaments melt and retract into the belt matrix material, thus eliminating any chance of exposure or popping out during the end-welding process. It is believed the retraction is the result of relaxing the high-degree of orientation of the synthetic polymer molecules that was frozen-in during fiber formation.

Regardless of which synthetic polymer reinforcement member is used, field installations that currently require a skilled technician to be done properly could be achieved by those who have been trained but are less proficient at performing such a task. Likewise, belts requiring holes be placed across the width for drainage or suction applications would not need to be disposed of if such a stiffness member was inadvertently severed. In these instances a heat source would be applied to the area and the thermoplastic synthetic polymer filaments would melt back into the belt.

Figure 2:
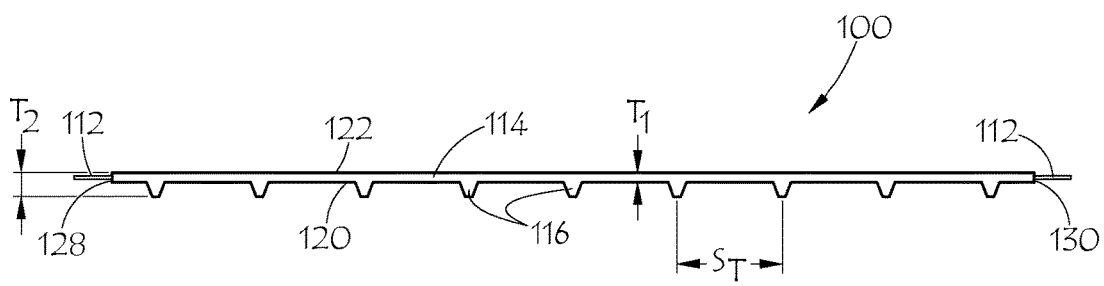
FIG. 2 is a side view of the belt shown in FIG. 1.
Figure 3:
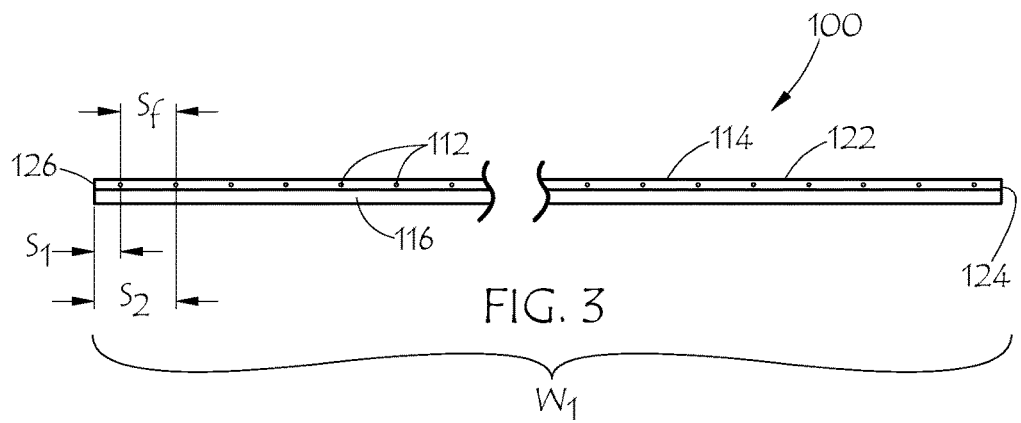
FIG. 3 is an end view of the belt shown in FIG. 1.
Figure 12:
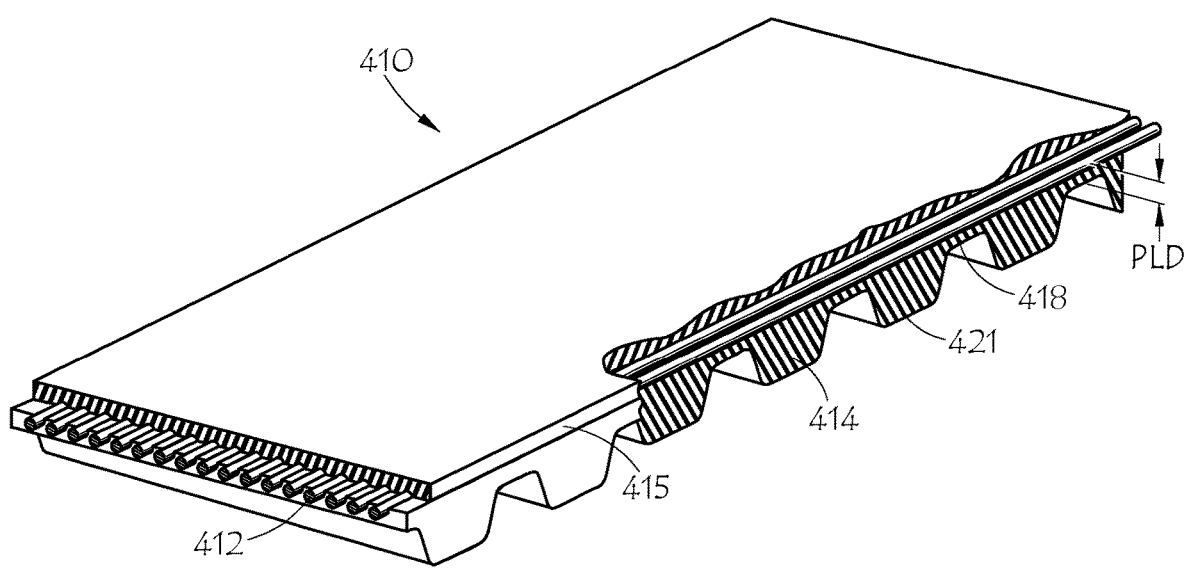
FIG. 12 is a partially fragmented perspective view of a belt made by the system of FIG. 11.

An example reinforced food grade belt 100 is shown in FIGS. 1-3. The belt 100 includes a plurality of filaments 112 embedded in a first layer 114 (also referred to as a web 114 or a web material 114). A plurality of teeth 116 are formed along one surface of the belt with land regions 118 between adjacent teeth 116. The belt 100 includes first and second side surfaces 120, 122, first and second edges 124, 126, and first and second ends 128, 130. The belt 100 has a thickness $T_1$ for the first layer 114, and a total thickness $T_2$, as shown in FIG. 2. A pitch line differential PLD may be defined as the distance of the centerline of filaments 112 from the first side surface 120, as shown in FIG. 12. The filaments 112 are spaced from second edge 126 a distance $S_1$ for a first filament, $S_2$ for a second filament, and so forth for each of the filaments 112. A spacing $S_F$ is provided between each adjacent filament.

Figure 9A:
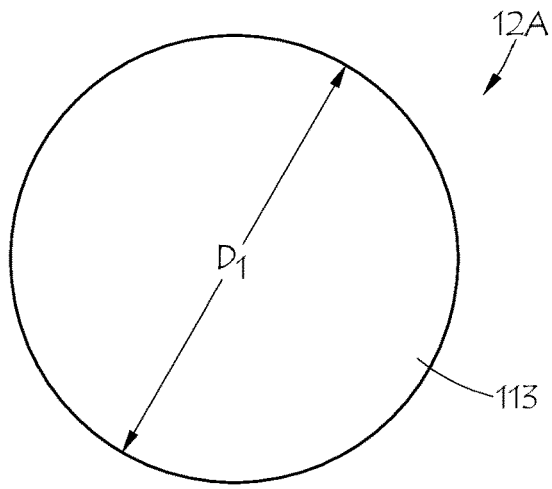
FIGS. 9A-9C are end views of example filament in accordance with the present disclosure.
Figure 9B:
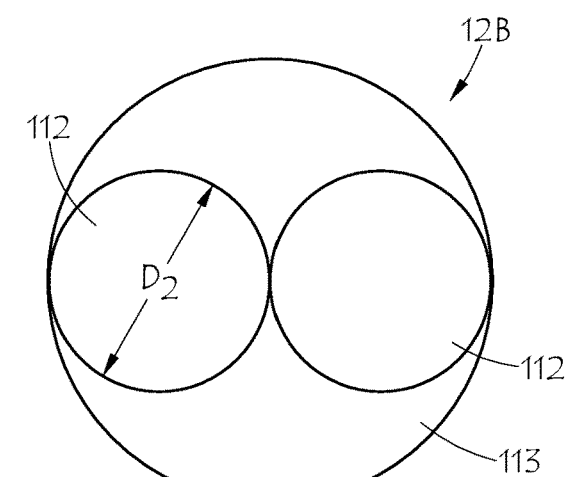
Figure 9C:
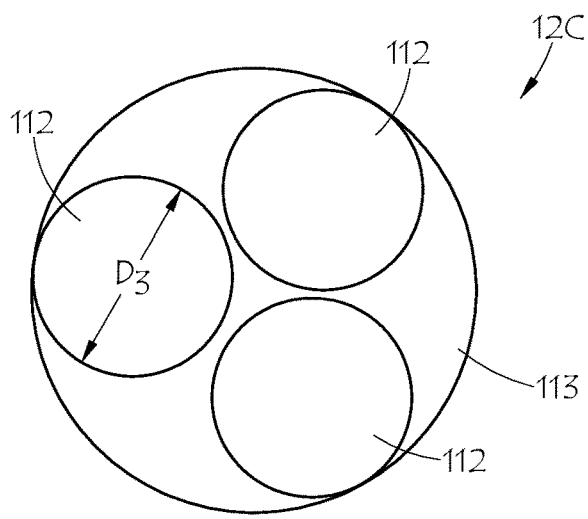

The filaments 112 may be configured as a monofilament 12A having a single strand structure such as the filament 112 having a profile 113 and diameter $D_1$ as shown in FIG. 9A. Alternatively, the filaments 112 may be combined as a multi-filament cord 12B, 12C as shown in FIGS. 9B and 9C, respectively. The pair of filaments 112 shown in FIG. 9B may each have a diameter $D_2$. The diameter $D_2$ may be smaller than the diameter $D_1$ such that both filaments 112 fit within a profile 113 that is the same as diameter $D_1$ shown in FIG. 9A.

FIG. 9C illustrates another example multi-filament cord 12C having three filaments 112, each having a diameter $D_3$. The filaments 112 shown in FIG. 9C may fit within the same profile 113 that is equal to the diameter $D_1$ shown in FIG. 9A. Other embodiments are possible that include four or more filaments 112 that together fit within the same sized profile 113. Some embodiments may include ten or more individual filaments 112, or hundreds or thousands of filaments, such as filaments as small as a few microns in diameter. The multi-filament cords disclosed herein may have a combination of filaments with different diameters and that fit within a profile 113 that is different from the diameter $D_1$ of the monofilament shown in FIG. 9A.

The filaments 112 included with the multi-filament cords 12B, 12C may have various arrangements, such as being twisted, braided or arranged in parallel in a side-by-side arrangement. A multi-filament cord having the same profile 113 as the monofilament 12A shown in FIG. 9A may have greater flexibility properties than a monofilament of the same materials. A multi-filament cord may have other advantages over a monofilament, although a monofilament has at least the advantage of a simple, single structure that may be easier to manufacture and handle. A multifilament yarn may be twisted (e.g., cabled if multiple yarns are used) with a number of turns per inch or turns per meter, which may optimize the balance between tensile strength and flexibility and handling.

The filaments 112 are shown in the figures having a circular cross-sectional shape. Other cross-sectional shapes may be possible, including, for example, rectangular or oval. Various cross-sectional shapes may be selected for their inherent properties, such as flexibility, rigidity, or the like.

The filaments 112 may comprise a polymer material such as, for example, a nylon-based material, an acrylic, a modacrylic, a polyolefin (such as polyethylene, polypropylene, and the like), vinylon, or a polyester. Other types of polymer materials may be used including, for example, a co-polymer (e.g., two or more types of nylon, or olefins, etc.), fluorocarbons, and hybrid strands such as, for example, nylon/fluorocarbon. In at least some examples, the filaments comprise a synthetic polymer. Synthetic, thermoplastic polymers generally are known to be meltable. In some example, one filament comprising such a synthetic, thermoplastic polymer can be connected to another such filament by heating the two filaments. It is also preferable that the material in the filaments can retract on heating, as well as to melt and flow together. It may also be advantageous if melting, followed by cooling or curing of the filament materials, creates a connection or bond to secure the two filaments (or ends of a single filament) together, or creates a connection or bond between the filaments and the web material 114.

Generally, the filaments 112 comprise a material that has a melting temperature equivalent to or less than the melting temperature of the materials used to produce the body of the belt 100 (i.e., first layer 114). The filaments 112 would, with such a melting point, effectively melt into the belt where the belt ends are connected together using a heat source as part of forming a continuous loop belt. The melting point of the filaments 112, when provided at a level that is at or below of the melting point of the primary material of the belt, essentially permits the filaments 112 to always be embedded within the remaining portions of the belt so as not to be exposed to environmental conditions which may otherwise make the filaments 112 a host for bacteria or other conditions that would affect the belt's ability to meet food grade standards.

The first layer 114 (which may also be referred to as web material 114) may comprise a polymer material such as, for example, thermoplastic polyurethane (TPU) or other suitable thermoplastic elastomer (TPE). A preferred filament material with a suitable melting point for use with TPU or TPE is a polyolefin. A preferred polyolefin is ultra-high-molecular-weight polyethylene (UHMWPE), which has tensile properties rivaling aramid fibers. Exemplary UHMWPE fibers and yarns for the filaments include those sold under the trademarks Spectra by Honeywell and Dyneema by DSM.

It may be noted that the filaments or cords may be twisted or not-twisted, depending on the needs of the belt application. The filaments may be used greige (untreated) or may be coated or treated, e.g., for improved adhesion, handling or the like.

Although a single layer of material for web material 114 is shown in the figures, multiple layers of material (e.g., first and second layers) may be used. In one example, multiple layers are formed separately and bonded together and/or one layer may be formed onto the other layer to make up the endless belt having the filaments 112 embedded therein. The filaments 112 may be embedded in any one of the layers or may be embedded between two or more of the layers. A variety of manufacturing methods and apparatuses may be used to create the belt 100 with the filaments 112 embedded therein. The method chosen is not critical to the resulting belt, as long as the method does not result in exposed cord on the edges or surfaces if food-grade applications are intended. FIGS. 11-15, which are describe in detail below, are examples of some such systems, apparatuses and methods that may be used to make the belt 100 shown in FIGS. 1-3 or any of the other belts disclosed herein.

Figure 4:
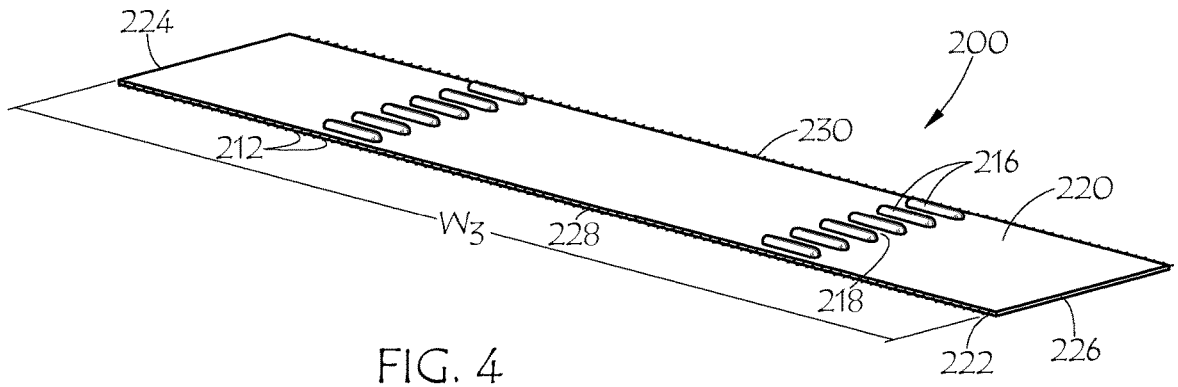
FIG. 4 is a perspective view of an example reinforced belt in accordance with the present disclosure.
Figure 5:
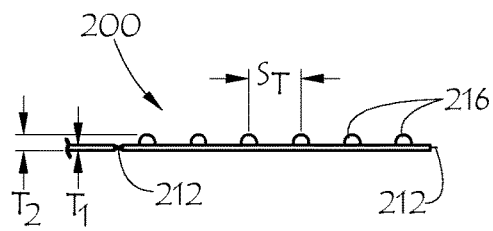
FIG. 5 is a side view of the belt shown in FIG. 4.
Figure 6:
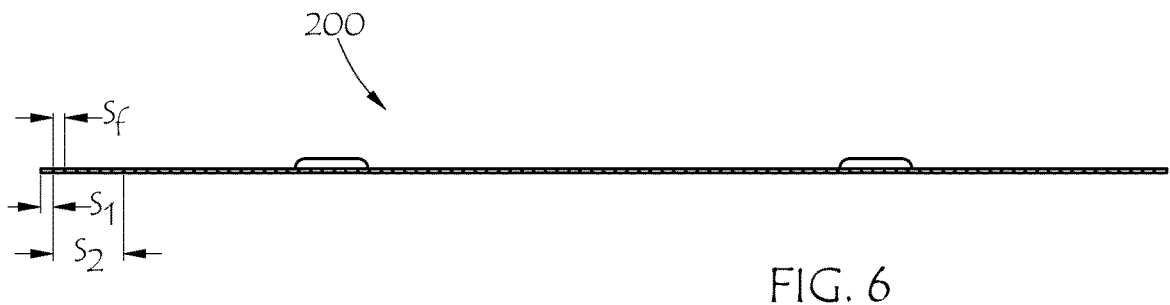
FIG. 6 is an end view of the belt shown in FIG. 4.

The teeth 116 are shown at spaced apart intervals along the length of the belt 100. The teeth 116 may have any desired profile shape (e.g., the shape show in the side view of FIG. 2). The teeth 116 may be spaced apart any desired distance ST and have the land region 118 provided therebetween. The teeth 116 are shown having a relatively linear, straight construction along their length. The teeth 116 may extend between the edges 124, 126 (i.e., an edge-to-edge arrangement). Alternatively, the teeth 116 may extend across only a portion of the width $W_1$ between the edges 124, 126, as shown in FIGS. 4-6. Other embodiments may be free of any teeth 116, such as the belt 300 described below with reference to FIGS. 7 and 8.

The thickness $T_1$ typically is in the range of about 0.1 inches to about 0.5 inches, and more particularly about 0.1 inches to about 0.2 inches. The thickness $T_2$ is typically in the range of about 0.2 inches to about 1.0 inches, and more particularly about 0.3 inches to about 0.5 inches. Generally, the thickness $T_1$ is greater than the maximum diameter $D_1$ of the filament 112 shown in FIG. 9A, and/or greater than the profile 113 of the multi-filament cords 12B, 12C shown in FIGS. 9B and 9C. Providing the thickness $T_1$ greater than the diameter $D_1$ and/or profile 113 makes it possible to completely embed the filaments 112 within the web 114. In at least some arrangements, the diameter $D_1$ and/or profile 113 is in the range of about 0.01 inches to about 0.1 inches, and more particularly about 0.02 inches to about 0.05 inches.

The width $W_1$ is typically in the range of about 2 inches to about 48 inches, and may be sized anywhere therebetween depending on a variety of factors and criteria for the belt 100. Other arrangements may include a width $W_1$ that is greater than 48 inches, such as between about 48 inches and about 84 inches. In at least some examples, the spacing $S_F$ between the filaments 112 is in the range of about 0.2 inches to about 2 inches, and more particularly about 0.3 inches to about 1.0 inch. The distance $S_F$ may be equal between all of the filaments 112. In some embodiments, the distance $S_F$ may be variable, such as closer together adjacent to the edges 124, 126 and spaced further apart towards the middle across the width $W_1$. The distance $S_F$ may be any desired size depending on the application and other properties for the belt 100. The spacing $S_F$ may vary significantly depending on, for example, the thickness $T_1$, the materials used for the belt 100, the number of teeth 116 and their spacing, and the type of material for the filaments 112 and first layer 114.

The distance $S_1$ from the edge of the belt 100 to the first filament 112 is typically in the range of about 0.25 inches to about 2 inches, and more particularly about 0.4 inches to about 0.6 inches. The distance $S_2$ is equal to $S_1$ plus the spacing $S_F$ between the filaments. The distance to each additional filament 112 is equal to $S_1$ plus the spacing $S_F$ between the filaments.

FIGS. 4-6 illustrate another example food grade belt 200 that includes filaments 212 formed in a web layer, a plurality of teeth 216 with land regions 218 positioned therebetween, first and second side surfaces 220, 222, first and second edges 224, 226, and first and second ends 228, 230. The belt 200 may include many of the same or similar features and properties as the belts 100 described above. Some differences between the belt 200 and the belts 100 described above include, for example, the width, the number, size and spacing of the teeth 216, and the number, size and spacing of the filaments 212 (i.e., $S_F$, $S_1$-$S_x$).

Figure 7:
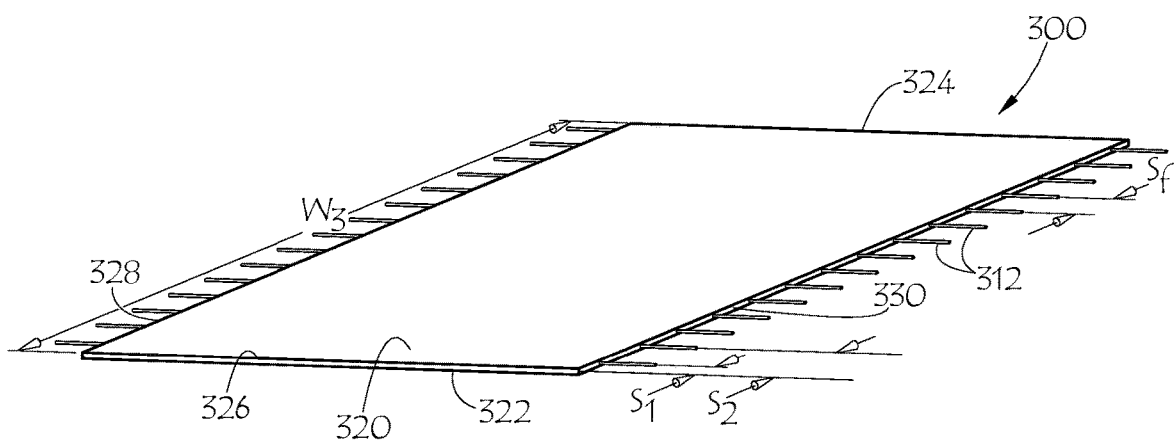
FIG. 7 is a perspective view of an example reinforced belt in accordance with the present disclosure.
Figure 8:
FIG. 8 is an end view of the belt shown in FIG. 7.

FIGS. 7 and 8 illustrate a further example food grade belt 300 that includes filaments 312 embedded in a web, first and second side surfaces 320, 322, first and second edges 324, 326, and first and second ends 328, 330. The belt 300 includes a web thickness $T_1$, a Width $W_3$, and filament spacing $S_F$, $S_1$-$S_2$. The belt 300 is free of teeth 116 on either the first or second side surfaces 320, 322. The example belts 100, 200, 300 shown in FIGS. 1-8 are exemplary only of the variety of belt constructions and designs that can benefit from use of one or more filaments 112, 212, 312 when used in combination with materials layer 114 (or similar layer for belts 200, 300), maintains a food grade rating for the belts, particularly when free ends of the belt are connected together to form a continuous loop belt.

Figure 10A:
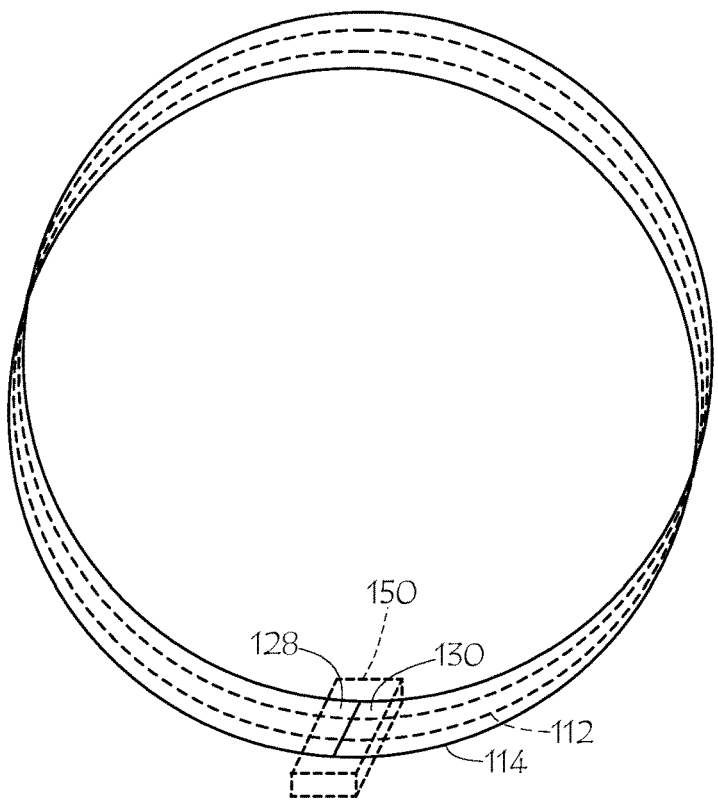
FIGS. 10A-10B are perspective views showing steps of forming an endless belt in accordance with the present disclosure.
Figure 10B:
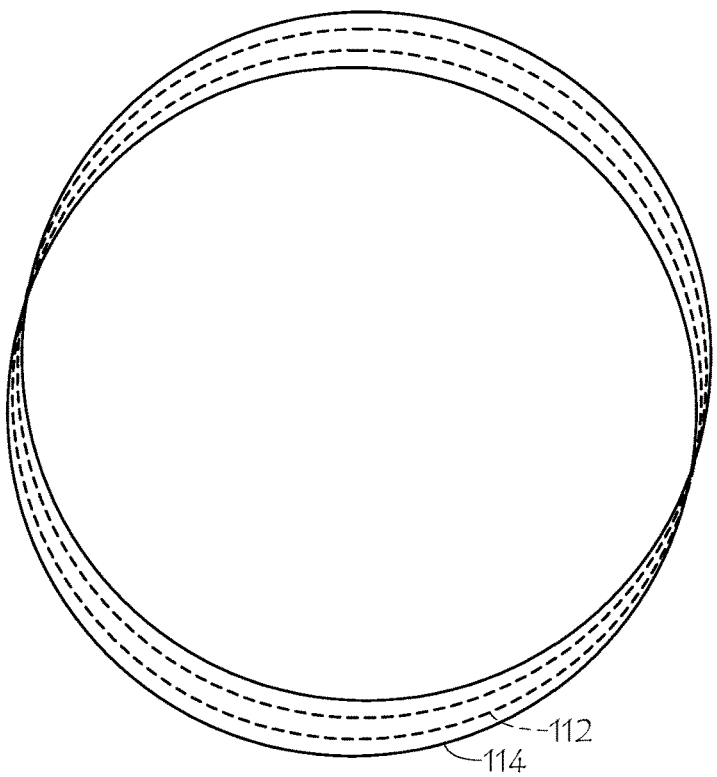

FIGS. 10A and 10B illustrate an example of an endless belt having ends 128, 130 fused together to form a continuous or endless loop. The ends 128, 130 are arranged adjacent to each other and a fusion device 150 operates to fuse the ends 128, 130 together. In at least one example, the fusing involved melting the material of filaments 112 and layer 114 such that the materials flow together to create a unitary structure. FIG. 10B shows the endless belt after completion of the fusing, wherein the ends 128, 130 are essentially eliminated due to the melting and retraction of the materials of filaments 112 and the melting of layer 114 and the subsequent solidification of those materials after the ends 128, 130 are fused together.

Filaments that comprise a thermoplastic synthetic polymer may have different properties and resulting functionality as compared to conventional aramid materials such as Kevlar® which do not melt. The following Table I includes test data for a section of inventive reinforced belt that includes two twisted thermoplastic synthetic polymer cords (UHMWPE). Specimens were tested per a typical tensile test protocol using toothed insert grips. The specimens were held with three teeth at each end, with gauge length at approximately 5 inches. A preload of 2.0+/−0.3 pounds were applied. As noted in the results shown in Table I, the maximum load on average was 388 lbs., and a load at 2% extension on average was 37 lbs.

TABLE I

| Inventive Specimen No. | Maximum Load lbs. | Load at 2% Extension lbs. |
| --- | --- | --- |
| 1 | 398 | 37 |
| 2 | 382 | 37 |
| 3 | 386 | 36 |
| Average | 388 | 37 |

The results shown in Table I compare very favorably with similar test results from a conventional belt having two twisted aramid cords (e.g., Kevlar®) embedded therein. The test results for the conventional belt shown in Table II were tested per the same tensile test protocol using toothed insert grips. The specimens were inserted three teeth at each end, with gauge length at approximately 5 inches. A preload of 2.0+/−0.3 pounds was also applied. The maximum load on average was 298 lbs. The load at 2% extension on average was 27.3 lbs. Thus, a thermoplastic synthetic polymer cord with the same twist construction as an aramid fiber can be capable of withstanding higher loads.

TABLE II

| Comparative Specimen No. | Maximum Load (lbs.) | Load at 2% Extension (lbs.) |
| --- | --- | --- |
| 1 | 293 | 27.0 |
| 2 | 293 | 24.5 |
| 3 | 297 | 25.8 |
| 4 | 304 | 29.2 |
| 5 | 303 | 29.8 |
| Average: | 298 | 27.3 |

To test the weld, a similar tensile test was run on three example belts at three locations for each belt. The first location was a section of belt with no welds. The second location was at a butt weld. The third location was at a finger weld, with triangular fingers measuring about 30 mm wide at the base and about 70 mm in length (or height). The belt width tested in association with the data shown in Table III was about 3 inches with 3-4 cords in the belt. The results shown in Table III represent maximum load per cord for a comparative food grade belt having 1500-denier aramid cords, and the maximum loads per cord for two inventive belts, one with adhesive-coated UHMWPE cords and one with uncoated UHMWPE cords. The maximum load is a little smaller at the welds than in the unspliced portion of the comparative belt. Thus, a conventional belt spliced with either a butt weld or a finger weld would likely fail at the weld joint rather that at some location along the length of the belt away from the joint. On the other hand, for the inventive belts, the maximum load is greater at the welds that in the unspliced portion of the belt. Thus, an inventive belt spliced with either a butt weld or a finger weld would likely fail at a location spaced away from the joint rather that at the joint.

TABLE III

| Maximum Load (lbs./cord) of belt and welds | Comparative belt aramid cord | Inventive belt coated UHMWPE cord | Inventive belt uncoated UHMWPE cord |
| --- | --- | --- | --- |
| Belt (2 cords per 1.5") | 149.0 | 211.0 | 194.0 |
| Butt Weld (thru web) | 127.0 | 225.0 | 225.3 |

TABLE III-continued

| Maximum Load (lbs./cord) of belt and welds | Comparative belt aramid cord | Inventive belt coated UHMWPE cord | Inventive belt uncoated UHMWPE cord |
|---|---|---|---|
| Finger Weld (70 × 30) | 120.0 | 225.3 | 225.3 |

One reason for trying adhesive-coated UHMWPE cord was the general reputation UHMWPE has for poor adhesion to most matrix materials including TPU. One of the unexpected results from the data shown in Tables I-III is that in spite of the suspected lower adhesion between the UHMWPE fiber and the urethane belt as compared to adhesion of aramid to the urethane belt, the maximum load of the belt with UHMWPE is higher than that for a belt with aramid (see Tables I-III). An even more surprising result of the test data relates to the maximum load of the butt weld and finger weld for UHMWPE verses aramid as represented in Table III. In the aramid sample, the maximum load is smaller for welded joints as compared to an unspliced section of belt, as is typically expected for any belt joint. However, for the UHMWPE welded joints, the maximum load is greater than for an unspliced section of belt. It is hypothesized that a possible reason for this improvement in maximum load for a welded joint when using is that the UHMWPE material retracts away from the weld when its melting point is neared or exceeded (i.e., the filaments melting point in this case is equal to or less than that of the urethane used for the belt). Thus, there is no discontinuity from the filaments right at the weld interface. In contrast the conventional aramid cord does not melt or retract so it probably weakens the interface at the weld. Thus, regardless of the reason, the use of a meltable polymer cord can result not only in better sealing of the cord within the belt, but also stronger fused or welded joints.

In the following, processes and methods are described to make a toothed belt out of thermoplastic polyurethane with synthetic polymer filaments as tension members, using the method and apparatus of the invention. It should be understood that the invention is not limited to these exemplary methods, materials, apparatuses or belt types.

Figure 11:
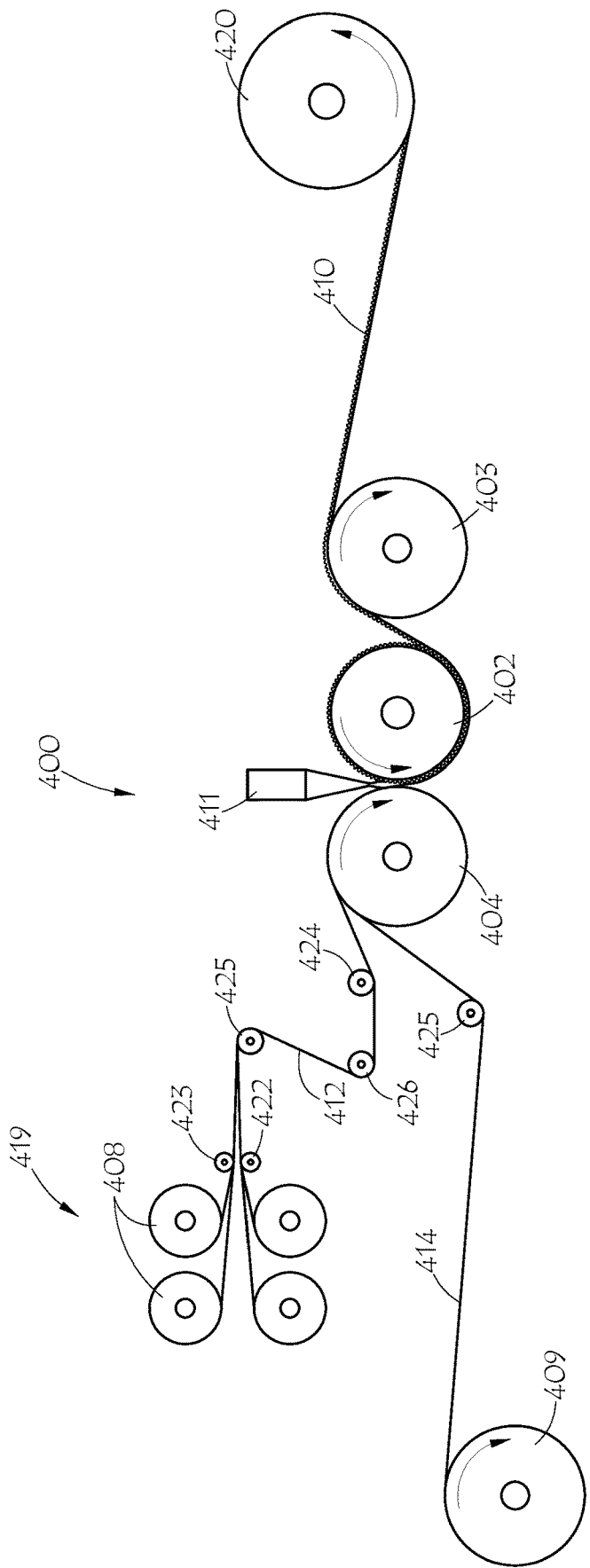
FIG. 11 is a schematic representation of a belt-making system according to an embodiment of the present disclosure.

A toothed belt 410 is shown in FIGS. 11 and 12 having three primary components: a base layer 414 (also referred to as a first layer or first layer material or first web material), a plurality of filaments 412 (also referred to as multi-filament members, tensile cords, and tension members), and a top layer 415 (also referred to a second layer or second layer material or profile layer). One or both of the top and bottom primary surfaces of the belt 410 could optionally include a woven or non-woven fabric, plastic film, or other surface treatment, although the belt 410 preferably comprises, in at least one embodiment, only food grade materials. The base layer 414 and top layer 415 could be the same material or could be two different thermoplastic materials. The base layer 414 and/or top layer 415 could be laminated from a plurality of layers of one or more materials or thermoplastic materials. The reinforcement, whether filament, multi-filament cord or the like, could be applied to the base layer 414, the top layer 415, or embedded between the base and top layers 414, 415.

The base layer 414 may be made of continuous extruded TPE or TPU having a flat surface on opposing sides, or may have teeth, or other desired belt profile, on one side and a flat surface on the opposite side. The top layer 415 may also be made of continuous extruded TPE or TPU having a flat surface on opposing sides, or may have teeth, or other desired belt profile, on one side and a flat surface on the opposite side. The base layer 414 and top layer 415 may be formed by known methods of extrusion forming or molding, such as the methods disclosed in U.S. Pat. Nos. 4,251,306 and 8,668,799, which are incorporated herein in their entireties by this reference, and which utilize a molding wheel and molding band adjacent about half of the circumference of the molding wheel to form a rotating profile molding chamber into which the profile material is extruded for continuous shaping.

The final thickness of the layers 414, 415 is selected to allow embedding of the tension member at a predetermined pitch line differential ("PLD"). PLD is a measure of the thickness of the belt under the cord line, and is defined as the distance from the belt surface in the land region to the cord center line, as indicated in FIG. 12. FIG. 12 is a partially fragmented bottom perspective view of the belt 410 shown in FIG. 11. The land region 418 is the thin section of the belt located between any two adjacent teeth 421 (see FIG. 12).

Filament 412 is typically made of continuous filaments. The filament 412 may include a monofilament, or may include a multi-filament cord in which the individual filaments are twisted into a cord. In some embodiments, the filament 412 has an adhesive coating to bond. Filament 412 is parallel to the belt edges. Two or more different filaments 412 may be placed in the belt side by side simultaneously. For example, one kind of filament, or two or more filaments of equal or opposite twist (i.e., S and Z twist) may be used as the filament 412. Preferably, the filament is fully embedded in the elastomer matrix without exposure at either side. An adhesive coating may be applied to the filament prior to cord laying in a separate operation or to the filament 412 or base layer 414 during filament laying in an integrated coating operation before the filament 412 contacts the elastomeric matrix material of one or both of the layers 414, 415.

Top layer 415 is typically made of a continuous TPE or TPU sheet of either the same material as the base layer 414 or a different material or different formulation. For example, the base layer 414 may be made of a relatively stiffer material for carrying high tooth loads, while the top layer 415 may be of a relatively softer material for higher flexibility, different coefficient of friction and/or for reduced noise and/or for reduced cost, or vice versa.

An example manufacturing process in accordance with the present disclosure includes the following steps with reference to the apparatus 400 as shown in FIG. 11. The base layer 414 having the desired flat surface on both sides, or a flat surface on one side and a texture (e.g., belt profile) on an opposite side, is provided in the desired length and width from a spool 409.

The base layer 414 is then fed around engaging roller 404 onto mandrel 402 as shown in FIG. 11. The mandrel 402 and engaging roller 404 are rotated at a predefined speed for filament laying by a filament applicator in a wrap portion of the mandrel 402 and roller 404. All the desired number of filaments 412 are laid at the same time, preferably in a parallel, lengthwise arrangement. The filament spacing may be uniform or in any other arrangement desired. In one example, sixteen filaments 412 are used. The filaments 412 are let off of a creel 419 which may have any desired number of spools 408 (only four are shown in FIG. 11), and the filaments 412 are guided, for example, by guides 422 and 423, and/or tensioned, for example, by tension rollers 425 and/or 426, and finally fed into the filament applicator roller 424.

The base layer 414 may be heated in advance of wrapping the base layer 414 onto the roller 404 and positioning the filaments 412 in contact with the base layer 414. Various heating means may be used depending on the type of material of the filament 412. For example, hot air blowers, radiant heaters, and the like may be used.

According to another embodiment, heated profile blades (not shown) may be positioned against the back side of the profile material to melt grooves into the profile material at a precise depth, width and temperature. The heated blades may have a profiled edge which forms a groove on the back side of the base layer 414. Then the filaments 412 are provided from filament creel 419 and supplied to the roller 404, which places the filament 412 into the groove at the desired depth to control the pitch line of the belt. The groove width and depth may be about the same as the filament diameter. The heated blade preferably acts like a plow as it forms a groove of molten material. A filament guide roller (not shown) may guide and press the filament 412 into the groove before the groove material re-solidifies. The distance between blade and filament guide roll, filament lay speed, and temperatures should be controlled such that the TPE material stays molten or at least tacky until the filament is embedded. The result is reinforced base layer 414 with filaments 412 fused thereon.

After completion of the filament laying operation, material for top layer 415 is applied to the base layer 414 with filaments 412 using an extruder 411. The extruder 411 illustrated in FIG. 11 applies molten TPE or TPU material onto the base layer 414 and filaments 412, and the molten material is pressed against the mandrel 402, base layer 414 and filaments 412 to form belt 410. Belt 410 may be taken up on spool 420.

The process of pressing the material of top layer 415 onto mandrel 402 may result in formation of a belt profile in the top layer 415. By belt profile it is meant a belt surface configuration adapted to engage a pulley or sprocket in driving relation thereof in a belt drive system. In a friction driven belt drive system, for example, the belt profile may be flat, or V-shaped, or multi-v-ribbed, while in a synchronous or positive drive system, the belt profile may be a series of evenly spaced transverse teeth or angled or helical teeth. In other arrangements, the mandrel 402 forms a flat, smooth surface on the top layer 415.

The process parameters of lamination speed and heat input should be adjusted such that only a thin skin of melting occurs on both surfaces without the material melting through and losing its shape. Even pressure along the whole length of the laminating rollers is also advantageous and may be facilitated by use of an elastomeric roll, although steel rollers provide better heat transfer. The optimum heating and melting amount permits the top layer to fully bond to the base layer and filaments, flowing around the portion of the filament not yet embedded, but not disturbing the pitch line and position of the filament.

The open-ended belt may be cut to a desired length and joined by known methods to form an endless belt, and in the case of a toothed belt, with the desired number of teeth. Fusion of the ends may be, as non-limiting examples, by thermal fusion by heat treatment or ultrasonic welding, direct adhesion, or thin film or adhesive tape, or clamps, with butt joint or finger joint, or combinations thereof.

Any process in which the belt may be wholly sealed from the intended use environment as may be used for food service or other "clean belt" applications requiring cleaning, sterilization or the like (referred to as "food grade" applications).

Separate manufacture of the base layer 414 and the top layer 415 has a number of advantages over prior methods where everything was formed and assembled on the same apparatus. Separate manufacture allows base and top layer materials to be made at optimum speeds for extrusion, generally much faster than possible when filament laying and/or laminating is done at the same time. Separate manufacture also permits much easier set up of the belt making system of FIG. 11, and for a much simpler design of that apparatus and lower capital cost. In particular, a complicated extruder with crosshead die for multiple filaments and a conventional molding pressure band and its associated drive system are not necessary. Set up times may be significantly reduced and filament material utilization may be improved.

Figure 13:
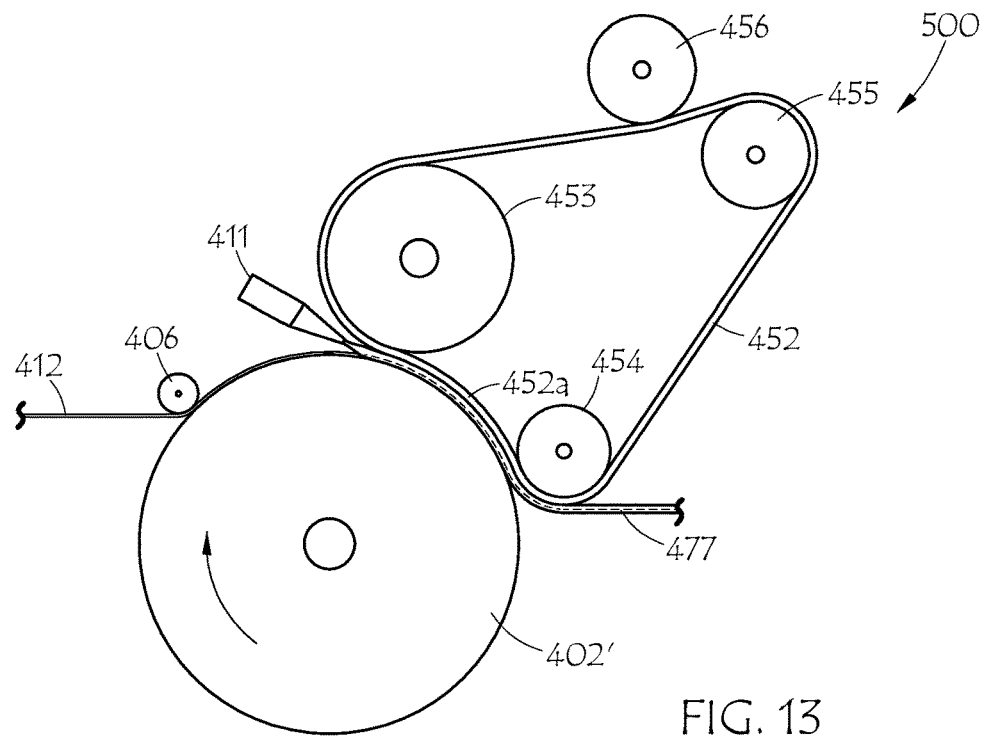
FIG. 13 is a schematic representation of a portion of a belt-making system according to another embodiment of the present disclosure.
Figure 14:
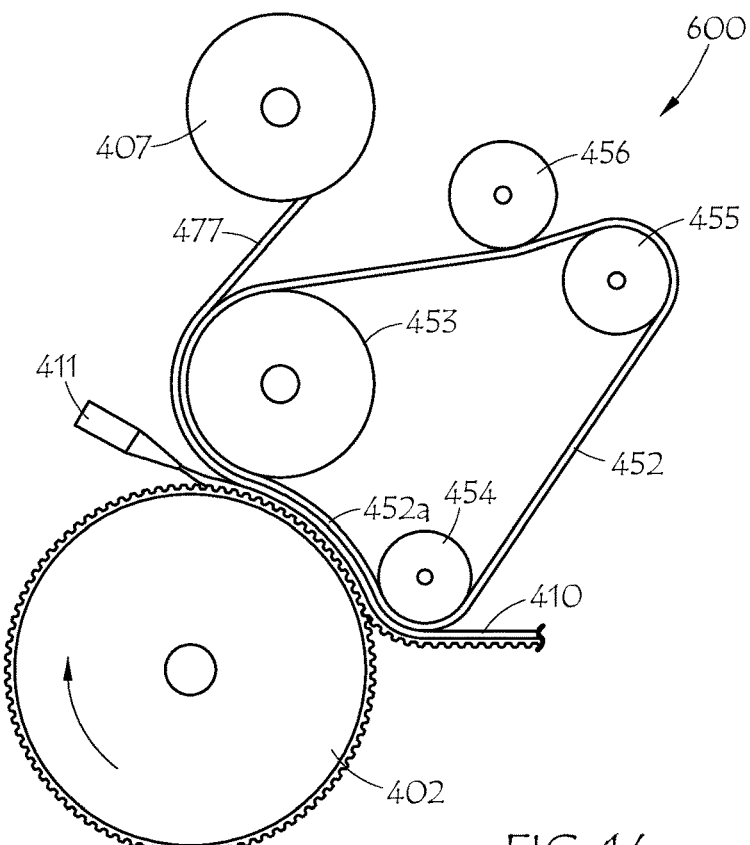
FIG. 14 is a schematic representation of a portion of a belt-making system according to another embodiment of the present disclosure.

FIGS. 13 and 14 illustrate additional example methods or systems 500, 600, respectively. In a first step shown in FIG. 13, filament(s) 412 are laid onto a smooth mandrel 402' and then coated with matrix material from extruder 411 which is then cooled under the pressure band 452 to form carcass 477, which is a flat film with filament embedded right at the surface. The filaments 412 may be multiple parallel filaments 412 as described for other embodiments. In a second step, shown in FIG. 14, profile mandrel 402 replaces smooth mandrel 402', in order to make a profiled belt 410. Of course, the smooth mandrel may be used again if a flat belt is to be made. The extruder and pressure band section are now used to form the profile layer while the flat carcass 477 is fed into the pressure band section at the same time. Thus, the flat carcass, containing the tensile filament, is laminated to the profile layer as the profile layer is formed. The surface of the carcass at which the filament 412 is just embedded is preferably placed against the profile layer to seal the filament 412 therein. The first step is found to provide a flat film with very good control of the filament position, since the filament 412 is laid on a smooth mandrel. The resulting belt 410 has very good filament control, and the PLD may easily be controlled by the positioning of the pressure band. According to another variation, this two-step process could be carried with a laminating roller suitable arranged close to the mandrel or forming roller, instead of the pressure band shown in the figures.

Alternately, this or many of the other variations could be achieved by two or more passes of material(s) through apparatus similar to that described herein. A first pass, for example, could make the carcass, whether toothed or flat. A second pass could form and/or laminate a top layer onto the carcass. Another pass could weld or glue or fasten on profile parts, such as belt teeth for driving the belt on pulleys, or other objects, profiles, holders or such features which might ultimately be used for transporting items or material handling or the like.

Figure 15:
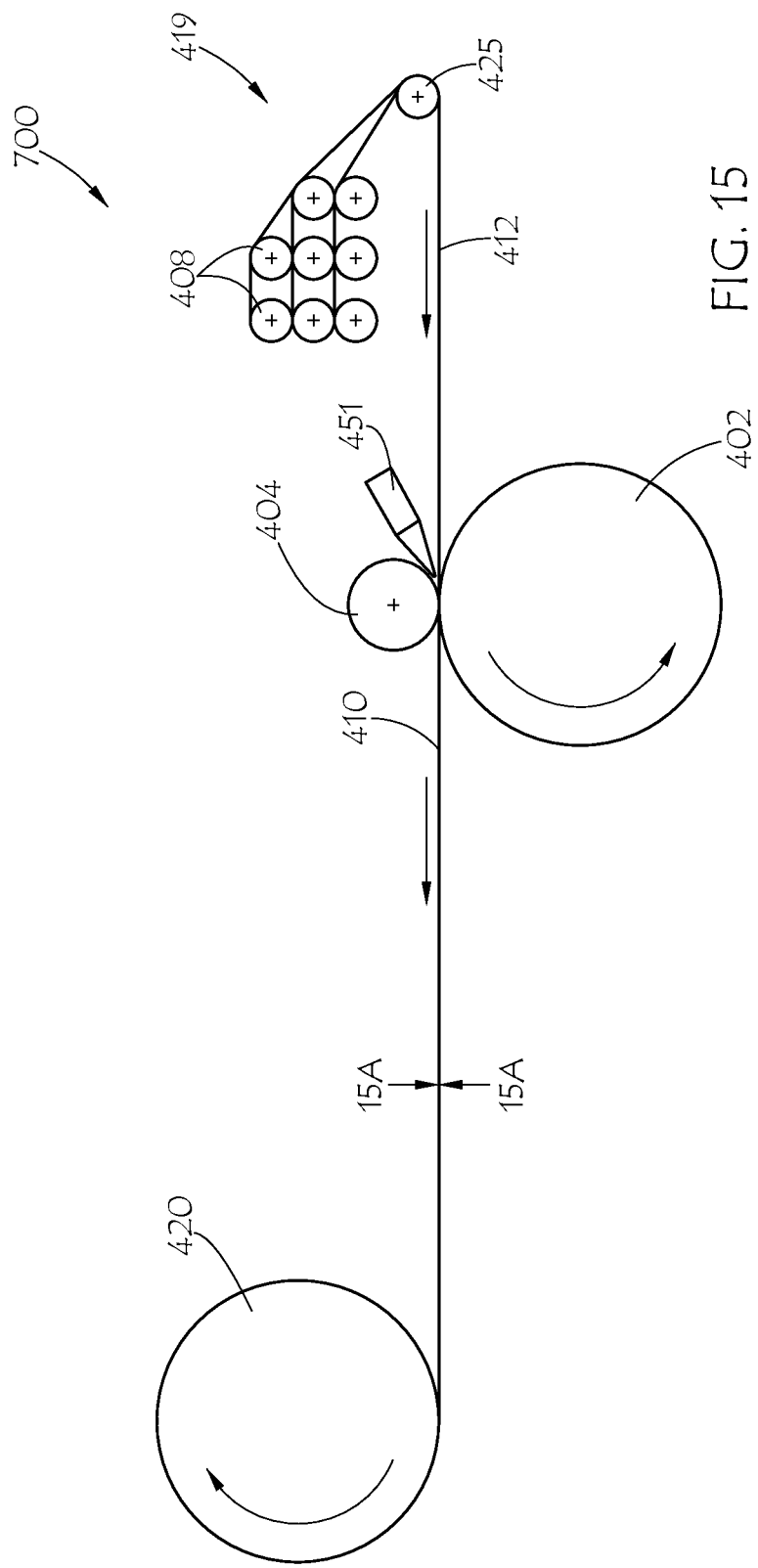
FIG. 15 is a schematic representation of a portion of a belt-making system according to another embodiment of the present disclosure.

Another example system and related method 700 of forming a reinforced belt 410 is shown in FIG. 15. The belt 410 has a base layer or base layer 414 formed onto a plurality of filaments 412. The belt 410 is formed using a straight through die process. The die may be attached to some type of extruder 411. The system 700 may include rollers 402, 404 as in a calendar method of forming a reinforced belt.

Filament 412 is typically made of continuous filaments. The filament 412 may include a monofilament, or may include a multi-filament cord in which the individual filaments are twisted into a cord. In some embodiments, the filament 412 may have an adhesive coating to bond. The filaments 412 are let off of a creel 419 which may have any desired number of spools 408, and the filaments are guided and/or tensioned by tension roller 425, and finally fed into the rollers 404 and 424.

Figure 15A:
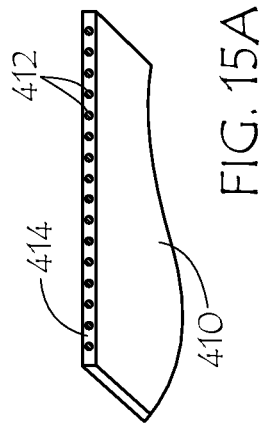
FIG. 15A is a perspective view of a cut portion of the belt shown in the system of FIG. 15.

Filament 412 is applied and fused to layer 414 in a continuous process during formation of the layer 414. Layer 414 is typically made of a continuous TPE or TPU sheet of material. A flow of the matrix material used to create layer 414 is fed between engaging roller 404 and mandrel 402 by an extruder 411, as shown in FIG. 15. FIG. 15A shows a cutaway of the resulting belt 410 with filaments 412 embedded in the layer 414. Belt 410 may then be taken up on spool 420. One or more of rollers 402, 404 may be profiled to make a desired profiled belt instead of the flat belt shown. Other systems may include a cross-head die in place of the rollers 402, 404.

Figure 16:
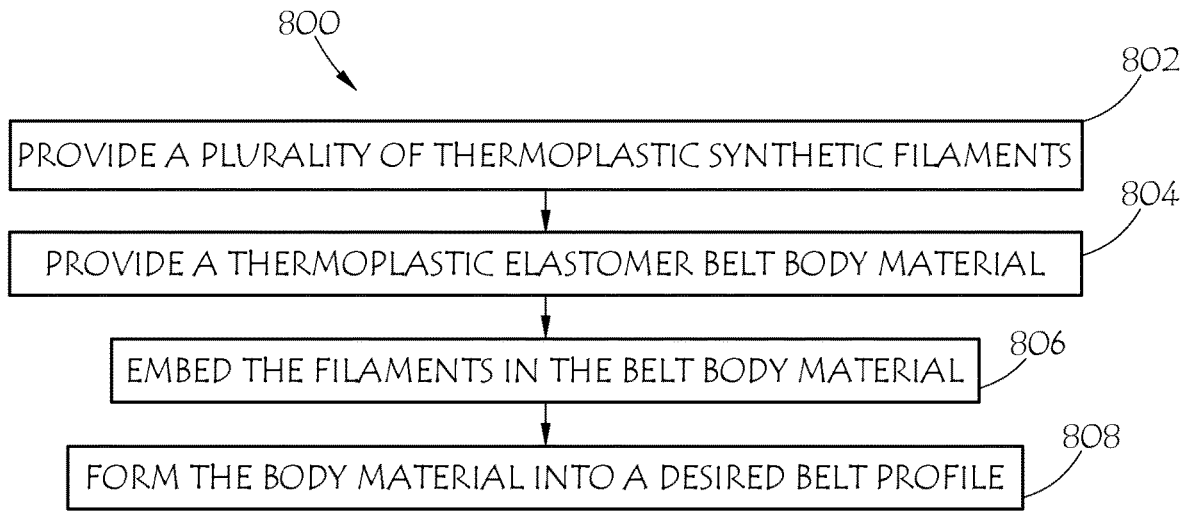
FIG. 16 is a flow chart of an embodiment of a method in accordance with the present disclosure.

FIG. 16 is a flow diagram showing steps of an example method 800 in accordance with the present disclosure. The method 800 may be directed to a method of manufacturing a reinforced food grade belt. The method 800 includes, at step 802, providing a plurality of thermoplastic synthetic filaments. Step 804 includes providing a thermoplastic elastomeric belt body material. At step 806, the method includes embedding the filaments in the belt body material. The step 808 includes forming the body material into a desired belt profile.

The method 800 may be continuous, resulting in long-length belting. The method 800 may include cutting the belting to a predetermined length and fusing the ends together to form an endless belt. The plurality of filaments may be melted during the fusing step. The plurality of filaments may be arranged in parallel and extend along a length dimension of the belt. The plurality of filaments may include a meltable synthetic polymer. The plurality of filaments may have a melting point that is approximately equal to, or equal to or less than, a melting point of the belt body material. The filaments may have a melting point that is within 50° C., or within 40° C., or within 30° C., or within 20° C., of a melting point of a belt body material. Each of the plurality of filaments may include a monofilament or a multi-filament cord. The filaments may be directed into the first layer material with a die during extrusion of the first layer material.

Figure 17:
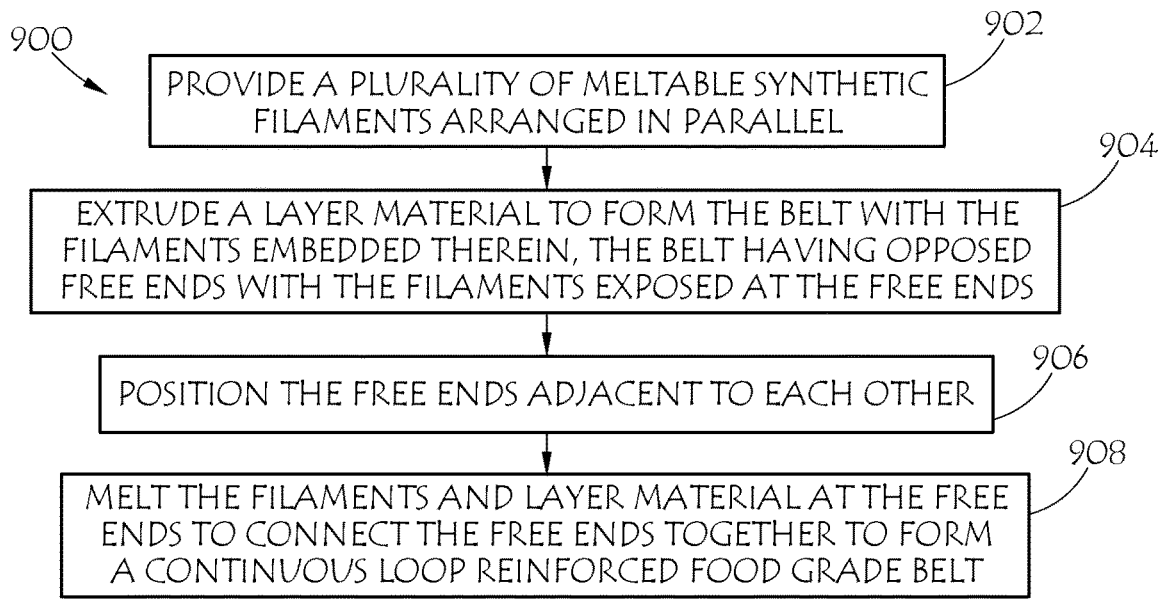
FIG. 17 is a flow chart of another embodiment of a method in accordance with the present disclosure.

FIG. 17 is a flow diagram showing steps of an example method 900 in accordance with the present disclosure. The method 900 may be directed to a method of manufacturing a continuous loop reinforced food grade belt. The method 900 includes, at step 902, providing a plurality of meltable synthetic filaments arranged in parallel. Step 904 includes extruding a layer material to form the belt with the filaments embedded therein, the belt having opposed free ends with the filaments exposed at the free ends. Step 906 includes positioning the free ends adjacent to each other. Step 908 includes melting the filaments and layer material at the free ends to connect the free ends together to form the continuous loop reinforced food grade belt. The filaments and layer material may include food grade polymer materials. Extruding the layer material may include extruding a first layer material onto the filaments, and extruding a second layer material onto the layer material.

The systems and methods described herein could also be used to make other forms of belting or belt-like articles, such as tracks for use in track drive systems for various types of track-driven vehicles.

The reinforced belts and related methods of manufacture disclosed herein may provide one or more of the following improvements/advantages over conventional solutions:

The ability to form a continuous loop, reinforced belt that is food grade compliant after connecting the free ends of the belt together to form the loop, by preventing any portions of the reinforcing filaments from being exposed after the connection is completed.

The use of reinforcing members that can provide increased strength to the belt at the weld joint as compared to portions of the belt spaced away from the joint.

The ability to more easily create food grade weld joints in the field with none of the filaments exposed.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A method of manufacturing a reinforced, food-grade belt, comprising:
   providing a plurality of thermoplastic synthetic filaments;
   providing a thermoplastic elastomeric belt body material;
   embedding the filaments in the belt body material; and
   forming the body material into a desired belt profile;
   wherein the method is continuous resulting in open-ended belting; and
   further comprising cutting the belting to a predetermined length, and fusing the ends together to form an endless belt; wherein the plurality of filaments are melted during said fusing step.

2. The method of claim 1, wherein the plurality of filaments are arranged in parallel and extend along a length dimension of the belt.

3. The method of claim 1, wherein the plurality of filaments include a meltable synthetic polymer.

4. The method of claim 1, wherein the plurality of filaments have a melting point that is within 50° C. of a melting point of the belt body material.

5. The method of claim 1, wherein each of the plurality of filaments includes a monofilament or a multi-filament cord.

6. The method of claim 1, wherein the filaments are directed into the body material with a die during extrusion of the body material.

7. A continuous loop reinforced food grade belt comprising:
   a plurality of extruded filaments comprising a meltable synthetic polymer;
   at least one thermoplastic matrix material embedding the filaments, the matrix material comprising a food grade polymer, the matrix material and filaments forming a length of belt having opposed first and second ends, the first and second ends of both matrix material and filaments being melted together to form a continuous loop belt with no filaments exposed to the belt environment.

8. The belt of claim 7, further comprising a second layer material extruded onto the first layer material, the filaments being embedded between the first and second layer materials.

9. The belt of claim 8, wherein the first layer material and the second layer material comprise thermoplastic elastomer or thermoplastic polyurethane.

10. The belt of claim 8, wherein the first layer material defines a smooth surface of the belt and the second layer material defines a surface having a plurality of ridges.

11. The belt of claim 7, wherein the filaments are continuous along a loop shape of the belt.

12. The belt of claim 7, wherein each of the filaments includes a monofilament or a multi-filament cord.

13. The belt of claim 7, wherein the belt is a positive drive belt.

14. A method of manufacturing a continuous loop reinforced food grade belt, comprising:
   providing a plurality of meltable synthetic filaments arranged in parallel;
   extruding a layer material to form the belt with the filaments embedded therein, the belt having opposed free ends with the filaments exposed at the free ends;
   positioning the free ends adjacent to each other;
   melting the filaments and layer material at the free ends to connect the free ends together to form the continuous loop reinforced food grade belt.

15. The method of claim 14, wherein the layer material includes food grade polymer materials.

16. The method of claim 14, wherein extruding the layer material includes:
   extruding a first layer material onto the filaments; and
   extruding a second layer material onto the layer material.

17. The method of claim 14, wherein extruding the layer material includes:
   extruding a first layer, then placing the filaments onto the first layer, and extruding a second layer over the filaments.

* * * * *